United States Patent
Lee et al.

(10) Patent No.: US 10,379,935 B2
(45) Date of Patent: Aug. 13, 2019

(54) AGENT SYSTEM FOR INTELLIGENT SYSTEM MANAGEMENT BY DIGITAL SUBSTATION AND OPERATION METHOD THEREFOR

(71) Applicant: Korea Electric Power Corporation, Naju-si, Jeollanam-do (KR)

(72) Inventors: Nam-Ho Lee, Daejeon (KR); Byung-Tae Jang, Daejeon (KR); Yong-Ho An, Daejeon (KR); Jeong-Yeol Han, Daejeon (KR); You-Jin Lee, Daejeon (KR); Jong-Kee Choi, Daejeon (KR); Seok-Kon Kim, Daejeon (KR)

(73) Assignee: Korea Electric Power Corporation, Naju-si, Jeollanam-do (KR)

( * ) Notice: Subject to any disclaimer, the term of this patent is extended or adjusted under 35 U.S.C. 154(b) by 285 days.

(21) Appl. No.: 15/317,097

(22) PCT Filed: Jun. 1, 2015

(86) PCT No.: PCT/KR2015/005468
§ 371 (c)(1),
(2) Date: Dec. 7, 2016

(87) PCT Pub. No.: WO2015/190732
PCT Pub. Date: Dec. 17, 2015

(65) Prior Publication Data
US 2017/0116072 A1    Apr. 27, 2017

(30) Foreign Application Priority Data
Jun. 11, 2014   (KR) .................. 10-2014-0070782

(51) Int. Cl.
*G06F 11/00*    (2006.01)
*G06F 11/07*    (2006.01)
(Continued)

(52) U.S. Cl.
CPC ...... *G06F 11/0793* (2013.01); *G05B 19/0423* (2013.01); *G06F 11/0709* (2013.01);
(Continued)

(58) Field of Classification Search
CPC ............. G06F 11/0793; G06F 11/0709; G06F 11/0736; G06F 11/0751; G06F 11/0778
See application file for complete search history.

(56) References Cited

U.S. PATENT DOCUMENTS

2003/0061335 A1*  3/2003  Thomas ................ G05B 19/00
                                                709/223
2010/0141050 A1*  6/2010  Saito ...................... H01H 9/563
                                                307/141
(Continued)

FOREIGN PATENT DOCUMENTS

CN         102394781 A  *  3/2012
KR    10-2009-0001509 A     1/2009
(Continued)

OTHER PUBLICATIONS

International Search Report dated Jul. 3, 2015 issued in International Patent Application No. PCT/KR2015/005468 (with English translation).

*Primary Examiner* — Bryce P Bonzo
*Assistant Examiner* — Katherine Lin
(74) *Attorney, Agent, or Firm* — Morgan, Lewis & Bockius LLP (57) ABSTRACT

The present invention relates to to an IEC 61850 information-based agent system for intelligent system management by a digital substation and an operation method therefor. To this end, an operating system-side agent device for sharing switch information, which is used in automatic recovery of a digital substation, between an operating system and an intelligent electronic device (IED) in the digital substation, the device including: a request unit requesting the switch
(Continued)

information from an intelligent electronic device-side agent device mounted in the intelligent electronic device (IED); and a communication unit receiving the switch information from the intelligent electronic device-side agent device, the switch information being collected by the intelligent electronic device-side agent device, wherein the operating system-side agent device is provided as a module, and is mounted in the operating system.

17 Claims, 7 Drawing Sheets

(51) Int. Cl.
   *H04L 12/24* (2006.01)
   *G05B 19/042* (2006.01)
   *H04L 12/26* (2006.01)

(52) U.S. Cl.
   CPC ...... *G06F 11/0736* (2013.01); *G06F 11/0751* (2013.01); *G06F 11/0778* (2013.01); *H04L 41/046* (2013.01); *H04L 41/0654* (2013.01); *H04L 43/10* (2013.01); *Y02B 70/3241* (2013.01); *Y04S 20/227* (2013.01); *Y04S 40/166* (2013.01); *Y04S 40/168* (2013.01)

(56) References Cited

U.S. PATENT DOCUMENTS

| | | | |
|---|---|---|---|
| 2011/0029148 A1* | 2/2011 | Yang | H02H 7/28 700/297 |
| 2011/0031095 A1* | 2/2011 | Di Maio | H01H 71/0228 200/293 |

FOREIGN PATENT DOCUMENTS

| KR | 10-2009-0108849 A | 10/2009 |
|---|---|---|
| KR | 10-2010-0048415 A | 5/2010 |
| KR | 10-2014-0057720 A | 5/2014 |

* cited by examiner

AGENT SYSTEM FOR INTELLIGENT SYSTEM MANAGEMENT BY DIGITAL SUBSTATION AND OPERATION METHOD THEREFOR

RELATED APPLICATIONS

This application is the U.S. National Phase under 35 U.S.C. § 371 of International Application No. PCT/KR2015/005468, filed on Jun. 1, 2015, which in turn claims the benefit of Korean Patent Application Nos. 10-2014-0070782, filed on Jun. 11, 2014, the disclosure of which applications are incorporated by reference herein.

TECHNICAL FIELD

The present invention relates generally to an agent system for intelligent system management by a digital substation and an operation method therefor. More particularly, the present invention relates generally to an International Electrotechnical Commission (IEC) 61850 information-based agent system for intelligent system management by a digital substation and an operation method therefor.

Further, this application claims the benefit of Korean Patent Application No. 10-2014-0070782, filed Jun. 11, 2014, which is hereby incorporated by reference in its entirety into this application.

BACKGROUND ART

Hitherto, a conventional substation, which is the center of an electric power system, transmits all information using electrical signals. Therefore, an amount of information that may be used in the conventional substation is limited. In addition, it is difficult to apply an intelligent system to the conventional substation because simple signals are used to transmit contents of the information. However, IEC 61850, which is an international standard for a digital substation automated system, has been in used since 2005, whereby conventional substations over the world have been digitized.

All electrical signals used to operate a conventional digital substation are changed into analog signals. The content and amount of information of a conventional digital substation are more various than those of the conventional substation. In addition, all signals of the conventional digital substation comply with IEC 61850, which is an international standard. Therefore, it is possible to inter-operate an intelligent electronic device (IED) providing a signal and a higher system collecting information regardless of manufacturers. An International standard digital substation may share various data for operation of the substation without limitations. Therefore, it has been impossible for an existing system to realize an intelligent application system by only using predetermined data and rules. Now however, it is possible to use various data to recognize state changes of the substation in real time, and to collect required data in real time to realize an application system for controlling various substations.

Here, the intelligent electronic device (IED) or a higher operating system, etc. of the conventional digital substation have an abundance of information for operating the conventional digital substation, and the information may be provided to a place requiring the information. However, all processes of providing the information are based on predetermined contents, and the information is maintained only in a fixed form. Therefore, there are limitations on collecting information for an application program such as failure recovery of the substation, etc.

In this regard, there is Korean Patent Application Publication No. 2007-0121238, titled "IEC 61850 based digital substation measuring partial discharge therein."

DISCLOSURE

Technical Problem

The present invention is intended to provide an agent system for intelligent system management by an IEC 61850 based digital substation and an operation method therefor, the agent system automatically performing failure recovery of the digital substation including an IED and an operation system in terms of a system or distribution regardless of any failure recovery algorithm.

Technical Solution

In order to accomplish the above object, the present invention provides an operating system-side agent device for sharing switch information, which is used in automatic recovery of a digital substation, between an operating system and an intelligent electronic device (IED) in the digital substation, the device including: a request unit requesting the switch information from an intelligent electronic device-side agent device mounted in the intelligent electronic device (IED); and a communication unit receiving the switch information from the intelligent electronic device-side agent device, the switch information being collected by the intelligent electronic device-side agent device, wherein the operating system-side agent device is provided as a module, and is mounted in the operating system.

In addition, the operating system-side agent device and the intelligent electronic device-side agent device may communicate with each other one to one.

In addition, according to an embodiment of the present invention, the operating system-side agent device may include a token generation unit generating a search token searching for a specific intelligent electronic device including the switch information requested by the request unit.

In addition, the search token may be transmitted to one intelligent electronic device-side agent device of all intelligent electronic device-side agent devices of the digital substation, and may store data of a comparison result of the requested switch information and switch information managed by the one intelligent electronic device-side agent device.

In addition, the search token sequentially may store the data of the comparison result with the all intelligent electronic device-side agent devices, and may transmit the data of the comparison result stored in the search token to the operating system-side agent device.

In addition, the switch information may include a switch attribute of a switch, a question answer attribute used in request and response between the intelligent electronic device-side agent device and the operating system-side agent device, and an IEC 61850 standard based common data class (CDC) model attribute.

In addition, the switch attribute may include at least one of a circuit breaker name, state information of the switch managed by the intelligent electronic device (IED), a control type for the switch operated by the intelligent electronic device (IED), control availability information of the switch, and interlock configuration information and interlock signal information that are used for controlling the switch.

In addition, the question answer attribute may include at least one of a question, a factor list, and an answer list.

In addition, the request unit may request control of a switch of the digital substation from the intelligent electronic device-side agent device according to a failure recovery algorithm of the operating system.

According to another aspect, there is provided an intelligent electronic device-side agent device for sharing switch information, which is used in automatic recovery of a digital substation, between an operating system and an intelligent electronic device (IED) in the digital substation, the device including: a collection unit collecting the switch information of a switch managed by the intelligent electronic device (IED), the collection unit transmitting the switch information to an operating system-side agent device through a communication unit, when the operating system-side agent device mounted in the operating system requests the switch information, wherein the intelligent electronic device-side agent device is provided as a module, and is mounted in the intelligent electronic device.

In addition, the operating system-side agent device and the intelligent electronic device-side agent device may communicate with each other one to one.

In addition, when a search token is received from the operating system-side agent device, the collection unit may determine whether or not the switch information is information requested by the operating system-side agent device by comparing the switch information with the search token, and may store data of a comparison result in the search token.

In addition, the collection unit may transmit the search token to another intelligent electronic device-side agent device after storing the data of the comparison result.

In addition, the switch information may include a switch attribute of the switch, a question answer attribute used in request and response between the intelligent electronic device-side agent device and the operating system-side agent device, and an IEC 61850 standard based common data class (CDC) model attribute.

In addition, the switch attribute may include at least one of a circuit breaker name, state information of the switch managed by the intelligent electronic device (IED), a control type for the switch operated by the intelligent electronic device (IED), control availability information of the switch, and interlock configuration information and interlock signal information that are used for controlling the switch.

In addition, the question answer attribute may include at least one of a question, a factor list, and an answer list.

In addition, according to an embodiment of the present invention, the intelligent electronic device-side agent device may include a control unit controlling the switch according to a preset failure recovery algorithm of the operating system, when request for controlling the switch is received from the operating system-side agent device.

According to still another aspect, there is provided an operation method for an agent system including both an operating system-side agent device and an intelligent electronic device-side agent device for sharing switch information, which is used in automatic recovery of a digital substation, between an operating system and an intelligent electronic device (IED) in the digital substation, the operation method including: collecting, by the intelligent electronic device-side agent device, the switch information of a switch managed by the intelligent electronic device (IED); requesting, by the operating system-side agent device, the switch information from the intelligent electronic device-side agent device; and receiving, by the operating system-side agent device, the switch information, wherein the operating system-side agent device and the intelligent electronic device-side agent device are respectively provided as modules, and are respectively mounted in the operating system and the intelligent electronic device.

In addition, at the collecting of the switch information, the operating system-side agent device and the intelligent electronic device-side agent device may communicate with each other one to one.

In addition, the collecting of the switch information may include searching for a specific intelligent electronic device including the switch information requested by the operating system-side agent device by using a search token generated by the operating system-side agent device.

In addition, according to an embodiment of the present invention, the operation method for the agent system may include: requesting, by the operating system-side agent device, control of the switch of the digital substation from the intelligent electronic device-side agent device according to a failure recovery algorithm of the operating system; and controlling, by the intelligent electronic device-side agent device, the switch according to the failure recovery algorithm.

Advantageous Effects

According to the agent system for the intelligent system management by the digital substation and the operation method therefor, the digital substation is digitalized based on international standard IEC 61850, whereby the digital substation can have an abundance of information that greatly exceeds that of a conventional analogue substation. In addition, it is possible to share information of data being used in the agent devices for the intelligent system, failure recovery of the digital substation, etc. without limitations. In addition, it is possible to provide the digital substation as a hierarchical system having higher and lower parts or as a horizontal system wherein agent devices may be subjects of system management at the same positions.

In addition, according to the agent system for the intelligent system management by the digital substation and the operation method therefor, the agent devices based on IEC 61850 information have configurations of a conventional digital substation. The agent device, which is an information sharing device is inserted into the IED or the operating system, whereby the agent device of the IED may collect and arrange the related data of information of the IED on the basis of the content of the request. Therefore, it is possible to directly perform the control command for the switch, etc. to the IED on the basis of need.

That is, according to the agent system for the intelligent system management by the digital substation and the operation method therefor, it is possible to autonomously collect required information without influence on the configurations of the digital substation. Thus, it is possible to provide an infrastructure environment between the agent devices so as to perform control of the switch, etc. of the digital substation regardless of any failure recovery algorithm.

In addition, according to the agent system for the intelligent system management by the digital substation and the operation method therefor, as a method of sharing information, the data model and communication service are used based on IEC 61850 standard of the digital substation without a separate protocol, whereby it is possible to provide interoperability for sharing data without separate communication interpretation conversion or interpretation functions.

In addition, according to the agent system for the intelligent system management by the digital substation and the operation method therefor, the above disclosed agent device is provided as a module such that the agent device can be mounted in the operating system or in the IED without limitations regardless of any failure recovery algorithm.

MODE FOR INVENTION

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, an agent system 1000 according to an exemplary embodiment of the present invention will be described.

Figure 1:
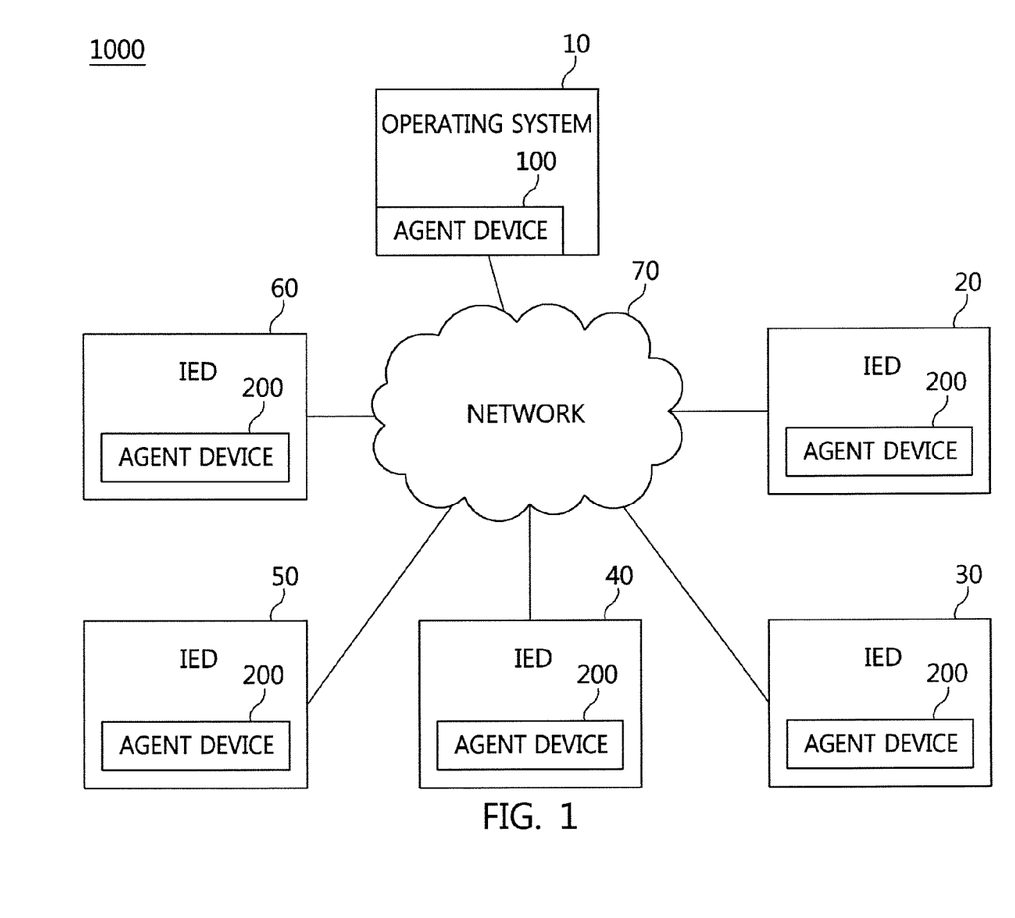
FIGS. 1 and 2 are schematic views showing an agent system according to an embodiment of the present invention.
Figure 2:
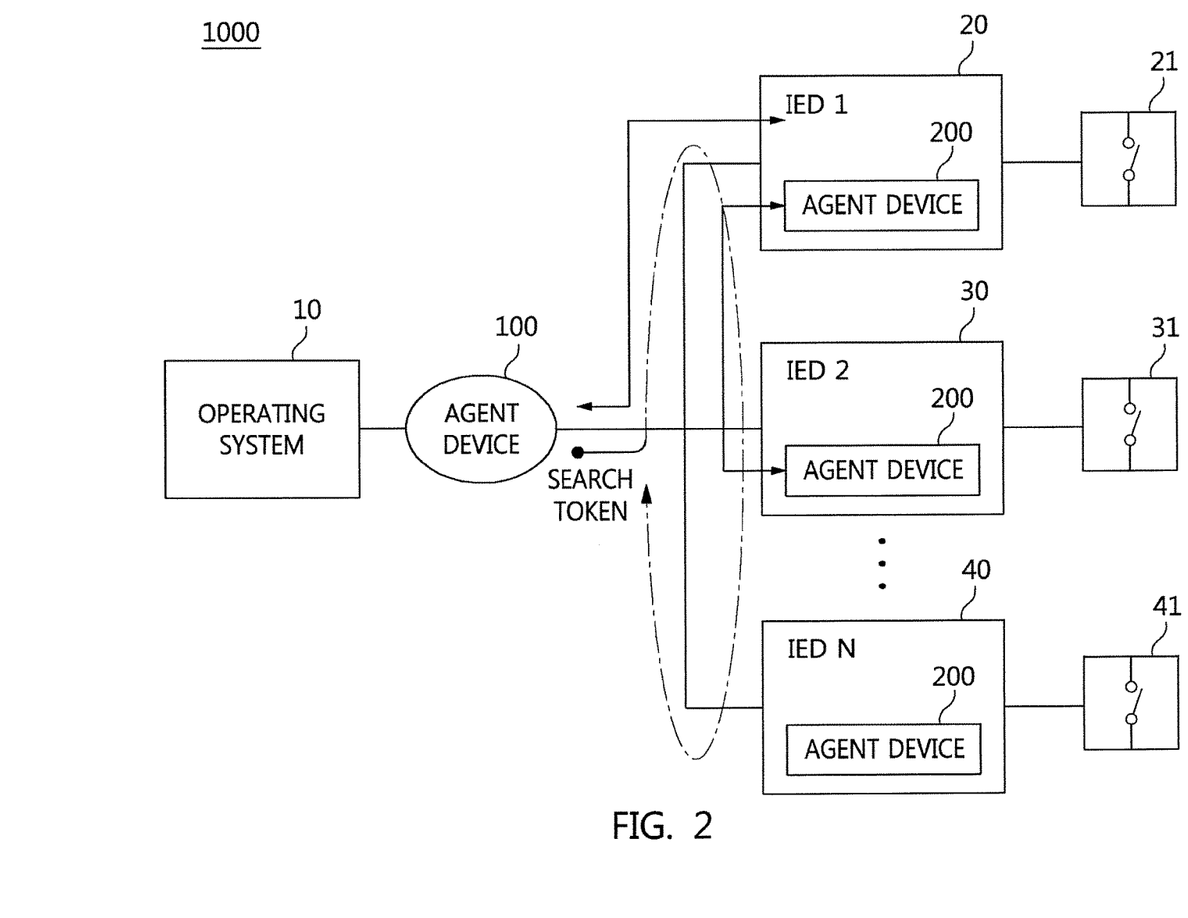

FIGS. 1 and 2 are schematic views showing an agent system 1000 according to an embodiment of the present invention. As described above, a digital substation may include a higher operating system, namely, an operating system 10 and a plurality of intelligent electronic devices (IEDs) 20, 30, 40, 50, and 60 performing management by the operating system 10. In addition, there is a network 70 between the operating system 10 and the plurality of intelligent electronic devices 20, 30, 40, 50, and 60, whereby the operating system and the plurality of intelligent electronic devices communicate with each other by wireless or wired methods. Here, according to an embodiment of the present invention, the agent system 1000 includes both the operating system 10 mounting an agent device 100 and the plurality of intelligent electronic devices 20, 30, 40, 50, and 60 mounting respective agent devices 200.

That is, the agent device 100 may be mounted in the operating system 10 of the digital substation, and the agent devices 200 may be mounted in the respective intelligent electronic devices 20, 30, 40, 50, and 60 of the digital substation. The agent devices 100 and 200 are respectively mounted in the operating system 10 and the intelligent electronic devices 20, 30, 40, 50, and 60, whereby information is realized and shared therebetween through the network 70 of the digital substation. Here, the agent devices 100 and 200 may share the information with not only a specific device or system but also any components of the digital substation.

In addition, the agent devices 100 and 200 use the digital substation and IEC 61850 service without using a separate communication standard. According to an embodiment of the present invention, the agent system 1000 may be used as a basic system for automatic failure recovery of the digital substation. That is, the operating system 10 includes a failure recovery algorithm. Here, according to the embodiment of the present invention, the agent system 1000 may collect and use information required for failure recovery regardless of a type of the failure recovery algorithm. In addition, the agent device 200 is mounted in the IED regardless of manufacturers or of specific IED functions. Therefore, like a switch or a circuit breaker, the intelligent electronic devices 20, 30, 40, 50, and 60 including switch information of the digital substation may exchange the switch information with any agent devices in the digital substation without limitations. Here, an example of exchanging information between the agent devices is disclosed in FIG. 2.

FIG. 2 is a schematic view showing an agent system 1000 including both the operating system 10 mounting the agent device 100 provided as a module and the plurality of intelligent electronic devices 20, 30, and 40 mounting respective agent devices 200 provided as modules.

As shown in FIG. 2, an operating system-side agent device 100 may communicate with each of intelligent electronic device-side agent devices 200 respectively mounted in the intelligent electronic devices 20, 30, and 40 one to one.

The operating system-side agent device 100 is mounted in the operating system 10, and requests switch information for control or failure recovery of the digital substation from each of the intelligent electronic device-side agent devices 200. In addition, the intelligent electronic device-side agent devices 200 are mounted in respective intelligent electronic devices 20, 30, and 40 by being provided as modules, and collects switch information, which is used in the control or failure recovery, of respective switches 21, 22, and 23. Here, the collected switch information may be transmitted in response to a request of the operating system-side agent device 100.

In addition, when failure occurs or it is required to control the switches 21, 31 and 41, the operating system-side agent device 100 may request control of the switches 21, 31 and 41 from the intelligent electronic devices 20, 30 and 40. Here, when it is required to control the switches 21, 31 and 41 in the case that failure occurs in the digital substation, it is possible to request the control of the switches on the basis of the failure recovery algorithm of the operating system 10. Here, the intelligent electronic device-side agent device 200 may control the switches 21, 31 and 41 or the circuit breaker in response to the request of the operating system-side agent device 100.

The operating system-side agent device 100 and the intelligent electronic device-side agent device 200 communicate with each other one to one. That is, the operating system-side agent device 100 designates a specific intelligent electronic device-side agent device 200, and requests the switch information or control of the switch from the specific intelligent electronic device-side agent device 200.

For example, the operating system-side agent device 100 may require searching for information required by itself rather than to search the specific intelligent electronic device-side agent device. That is, the operating system-side agent device 100 may use a search token when it is required to collect information from all intelligent electronic device-side agent devices 200 in the digital substation rather than from a specific agent device, or the operating system-side agent device does not know which agent device includes the information required by the operating system-side agent device.

The search token is generated by the operating system-side agent device 100, and may be used to search a specific intelligent electronic device including the information required by the operating system-side agent device 100. For example, as shown in FIG. 2, the search token may be transmitted from the operating system-side agent device 100 to the intelligent electronic device-side agent device of the intelligent electronic device 20, the intelligent electronic device-side agent device of the intelligent electronic device 30 and the intelligent electronic device-side agent device of the intelligent electronic device 40. The search token may perform the search process by comparing the information required by the operating system-side agent device 100 with the plurality of the intelligent electronic device-side agent devices.

In addition, the comparison result may be stored in the search token at each of the all intelligent electronic device-side agent devices. Lastly, the search token may be transmitted to the operating system-side agent device 100 that requested the information, whereby the collected information may be transmitted to the operating system-side agent device 100.

Figure 3:
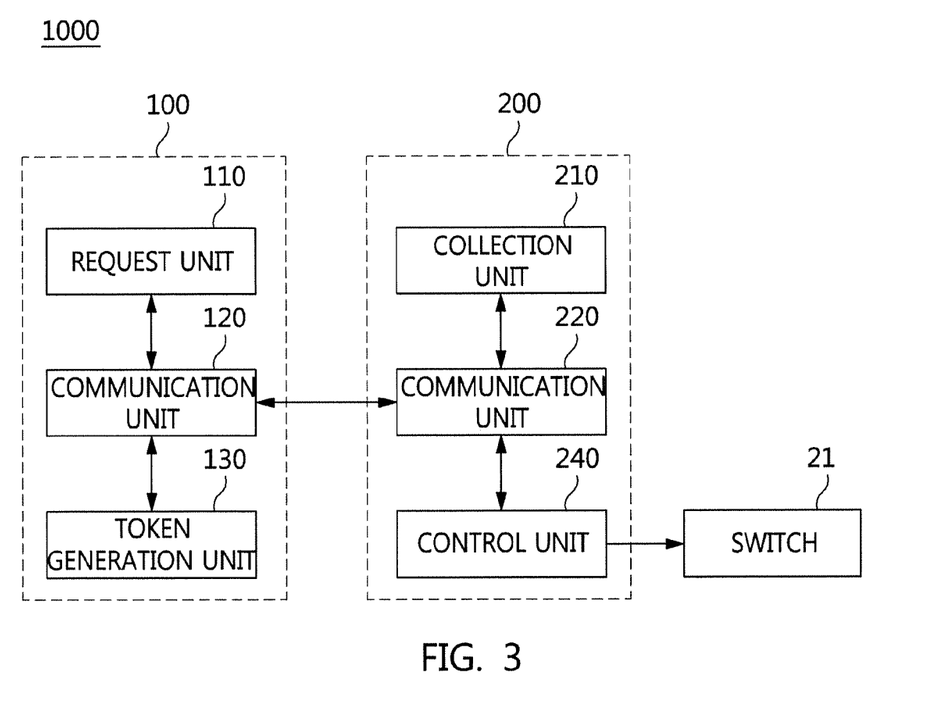
FIG. 3 is a block diagram showing an operating system-side agent device and an intelligent electronic device-side agent device according to an embodiment of the present invention.

FIG. 3 is a block diagram showing the operating system-side agent device 100 and the intelligent electronic device-side agent device 200 according to the embodiment of the present invention. As shown in FIG. 3, according to the embodiment of the present invention, the operating system-side agent device 100 may include a request unit 110, a communication unit 120, and a token generation unit 130. In addition, according to the embodiment of the present invention, the intelligent electronic device-side agent device 200 may include a collection unit 210, a communication unit 220, and a control unit 240. Descriptions of the above described configurations will be described hereinafter. As described above, the operating system-side agent device 100 and the intelligent electronic device-side agent device 200 may be respectively provided as modules, and may be respectively mounted in the operating system and the intelligent electronic device (IED) of the digital substation.

The request unit 110 requests the switch information from the intelligent electronic device-side agent device 200 mounted in the intelligent electronic device (IED). That is, when the operating system requires the switch information of a specific circuit breaker or a specific switch, it is possible to request the switch information from the intelligent electronic device-side agent device 200 managing the specific circuit breaker or the specific switch.

The communication unit 120 receives the switch information from the intelligent electronic device-side agent device 200, the switch information being collected by the intelligent electronic device-side agent device. That is, as described above, when the request for the switch information is transmitted from the request unit 110 to the intelligent electronic device-side agent device 200, the intelligent electronic device-side agent device 200 may transmit information, which is collected in advance, of a circuit breaker or a switch managed by the intelligent electronic device to the operating system-side agent device 100.

In addition, the request unit 110 requests control of a switch of the digital substation from the intelligent electronic device-side agent device according to the failure recovery algorithm of the operating system. That is, for example, when failure occurs in the digital substation, or it is required to control the specific switch or the specific circuit breaker for an operation that a worker requests, it is possible to transmit control request information to the intelligent electronic device-side agent device 200 by using the request unit 110, the intelligent electronic device-side agent device managing the specific switch of the specific circuit breaker.

The token generation unit 130 generates the search token searching for a specific intelligent electronic device including the information requested by the request unit 110. Here, the search token may be used, when the operating system-side agent device 100 does not know which agent device 200 includes switch information requested by the operating system-side agent device, or it is required to collect information of all intelligent electronic device-side agent devices 200. Here, a method of collecting information by using the search token is disclosed as follows.

First, the search token is transmitted to one intelligent electronic device-side agent device of all intelligent electronic device-side agent devices of the digital substation. Next, switch information requested by the request unit and switch information managed by the one intelligent electronic device-side agent device are compared with each other at the one intelligent electronic device-side agent device. After the comparison, the comparison result is stored in the search token at the one intelligent electronic device-side agent device, and the search token is transmitted to another intelligent electronic device-side agent device. That is, the search token is sequentially transmitted to the all intelligent electronic device-side agent devices, and performs the above disclosed processes.

The above disclosed processes are performed by the time when the comparison and the storage are completed at the all intelligent electronic device-side agent devices. Lastly, the search token is transmitted to the operating system-side agent device 100. Consequently, data of the comparison results stored in the search token is transmitted to the operating system-side agent device 100. Therefore, even though the operating system-side agent device 100 does not know which agent device manages the requested switch information among a plurality of intelligent electronic devices (IEDs), it is possible to know which agent device manages the requested switch information by using the search token, and to obtain the requested switch information.

As described above, according to the embodiment of the present invention, the intelligent electronic device-side agent device 200 may include the collection unit 210, the communication unit 220, and the control unit 240.

The collection unit 210 collects the switch information of the switch or the circuit breaker managed by the intelligent electronic device (IED). In addition, when the operating system-side agent device mounted in the operating system requests the switch information, the collection unit 210 transmits the switch information to the operating system-side agent device 100 through the communication unit 220. In addition, here, the operating system-side agent device 100 and the intelligent electronic device-side agent device 200 communicate with each other one to one.

In addition, when the search token is received from the operating system-side agent device 100 through communication unit 220, the collection unit 210 determines whether or not the switch information, which is collected by the collection unit, is information requested by the operating system-side agent device 100 by comparing the switch information with the search token. In addition, data of the comparison result may be stored in the search token. For example, when data collected by the collection unit 210 is data requested by the operating system-side agent device, the search token stores both the switch information, which is the requested data, and location data of the search token where the switch information exists. When data collected by the collection unit 210 is different from the requested data, a storage token may store information that the intelligent electronic device-side agent device 200 does not include the requested switch information. After the comparison and the storage, the collection unit 210 transmits the search token to another intelligent electronic device-side agent device through the communication unit 220.

In addition, when a request for controlling the switch is received from the operating system-side agent device 100 through the communication unit 220, the control unit 240 controls the switch 21 according to a preset failure recovery algorithm of the operating system.

The switch information that is used throughout the attached drawings and written description is designed by generating an IEC 61850 standard based common data class (CDC) model attribute and a partially new CDC. Here, data model of the switch information will be described in detail with reference to FIG. 4.

In addition, the operating system-side agent device 100 and the intelligent electronic device-side agent device 200 are described as separate components in the above-described embodiment, but this is just an example, and may be applied to have various forms by combining the components of the agent devices 100 and 200.

Figure 4:
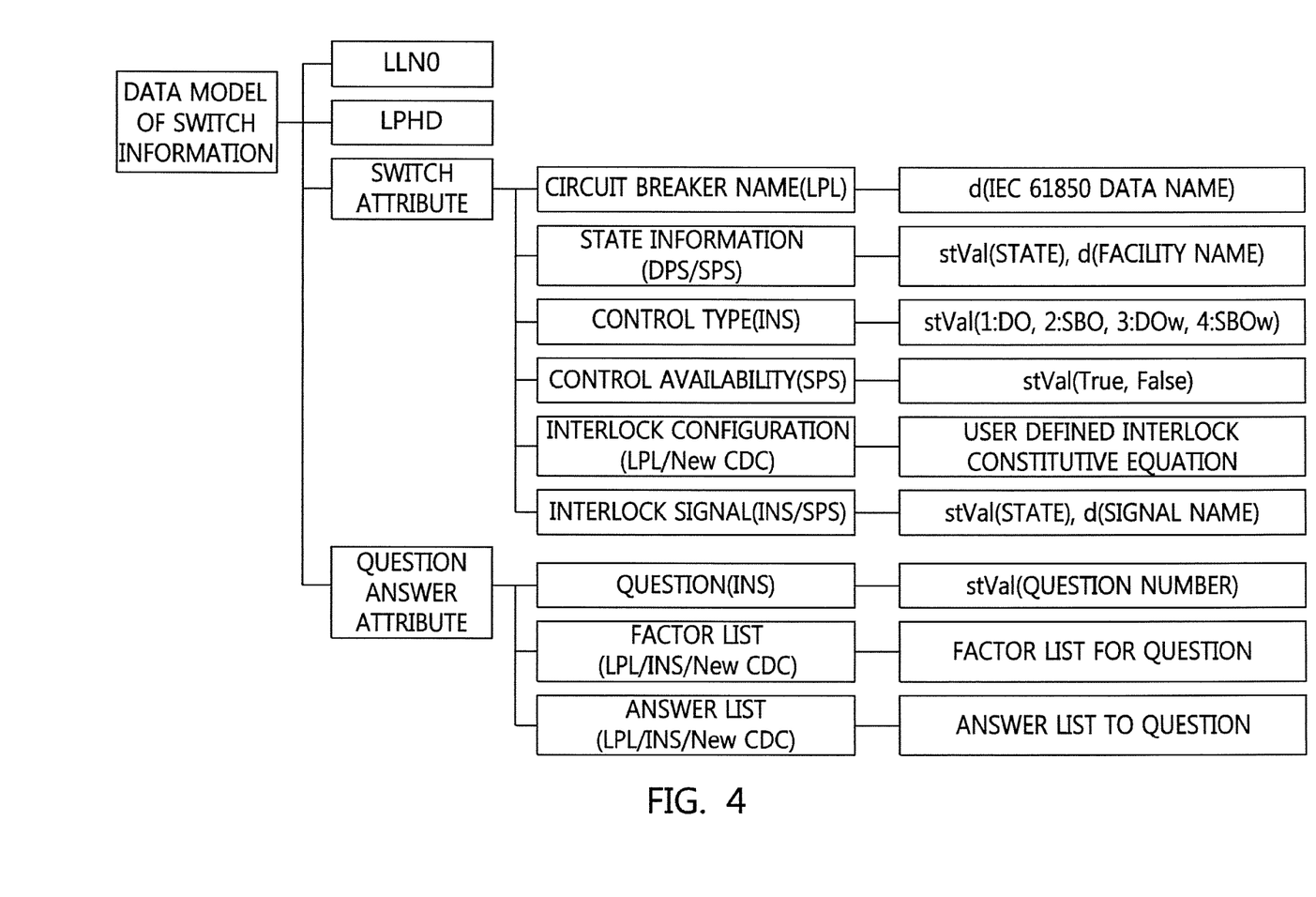
FIG. 4 is a view showing a data model of switch information being shared in the agent system according to an embodiment of the present invention.

FIG. 4 is a view showing a data model of switch information being shared in the agent system according to an embodiment of the present invention. As shown in FIG. 4, the data model of the switch information includes an IEC 61850 standard based common data class (CDC) model, namely, LLN0 and LPHD as logical nodes, and includes a new CDC, namely, a switch attribute (ISWI) of a switch and a question answer attribute (JQNA) used in request and response between the agent devices. Hereinafter, LLN0 and LPHD are specified in IEC 61850 standard, and additional descriptions thereof will be omitted.

The switch attribute (ISWI) is a data object, and may include at least one of a circuit breaker name (LPL), state information (DPS/SPS) of the switch managed by the intelligent electronic device (IED), a control type for the switch operated by the intelligent electronic device (IED), control availability information of the switch, and interlock configuration information and interlock signal information that are used for controlling the switch. Here, names of the objects are just examples. Depending to a situation or needs, the names of the objects may be changed or another object may be added. Here, descriptions of the objects are disclosed as follows.

Circuit breaker name (LPL): the circuit breaker name is realized by using LPL of an IEC 61850 common information model, and includes an IEC61850 data name of the switch of the IED connected with the agent device as an attribute value (d).

State information (DPS/SPS): the state information is realized by using DPS or SPS of the IEC 61850 common information model, and includes both an attribute value (stVal) having state information of the switch of the IED connected with the agent device, and an attribute value (d) having a proprietary name of the switch in the digital substation.

Control type: the control type is realized by using INS of the IEC 61850 common information model, and includes an attribute value (stVal) recording a type of the control command of the switch of the IED connected with the agent device. The attribute value (StVal) has integral values such as 1 indicating direction control (DO), 2 indicating control after selection (SBO), 3 indicating security-enhanced direction control (DOw) and 4 indicating security-enhanced control after selection (SBOw).

Control availability information: the control availability information is realized by using SPS of the IEC 61850 common information model, and includes an attribute value (stVal) indicating the control availability of the switch of the IED connected with the agent device. When the value of the attribute value is True, control is available, and when the value of the attribute value is False, control is unavailable.

Interlock configuration (LPL/New CDC): the interlock configuration is realized by using LPL or a new common information model for interlock configuration of the IEC 61850 common information model, and includes an attribute value having the interlock information for control of the IED connected with the agent device.

Interlock signal information (INS/SPS): the interlock signal information is realized by using INS or SPS of the IEC 61850 common information model, and includes both an attribute value (stVal) indicating the state of data of the interlock configuration about the interlock information for control of the IED connected with the agent device, and an attribute value (d) having a real signal name used in the digital substation for the data of the interlock configuration. In addition, the interlock configuration and the interlock signal may be combined into one data object depending on a situation.

In addition, the question answer attribute (IQNA) is a data object, and may include at least one of a question, a factor list and an answer list. Descriptions of the data object of the question answer attribute (IQNA) are disclosed as follows.

Figure 6:
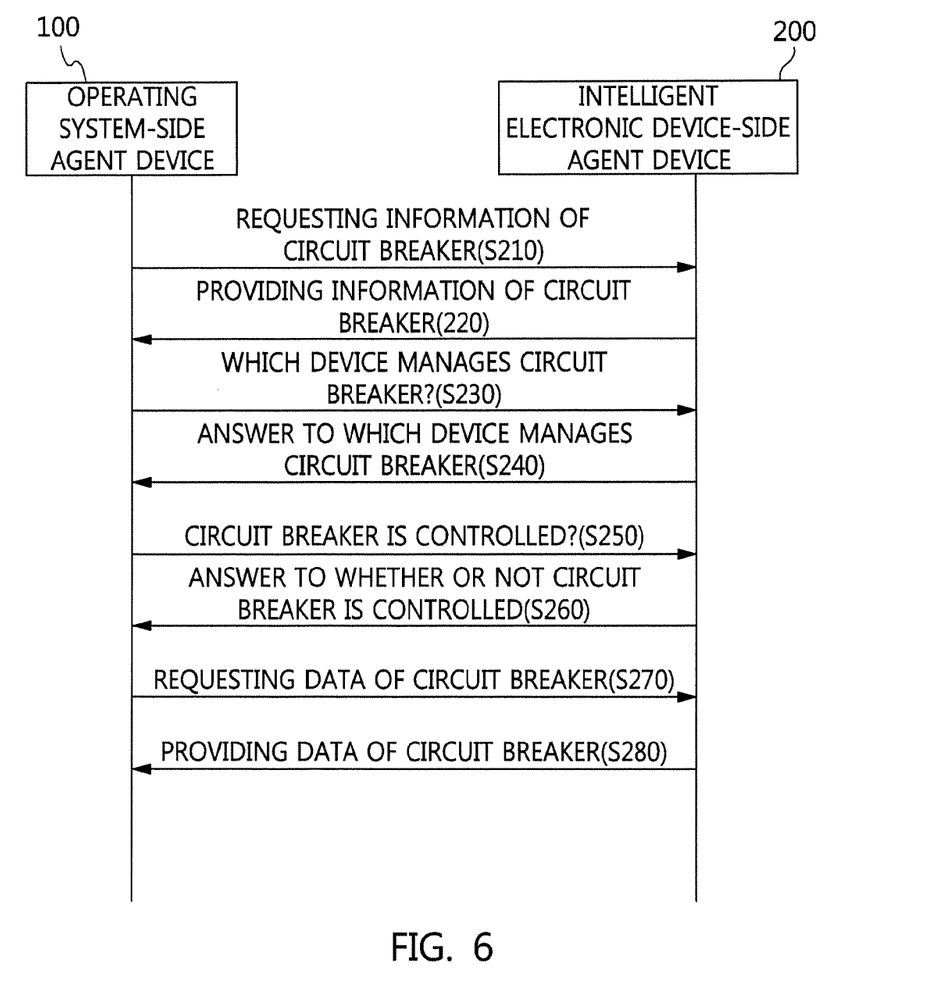
FIGS. 6 and 7 are flowcharts showing services that may be performed by an operating system according to an embodiment of the present invention.
Figure 7:
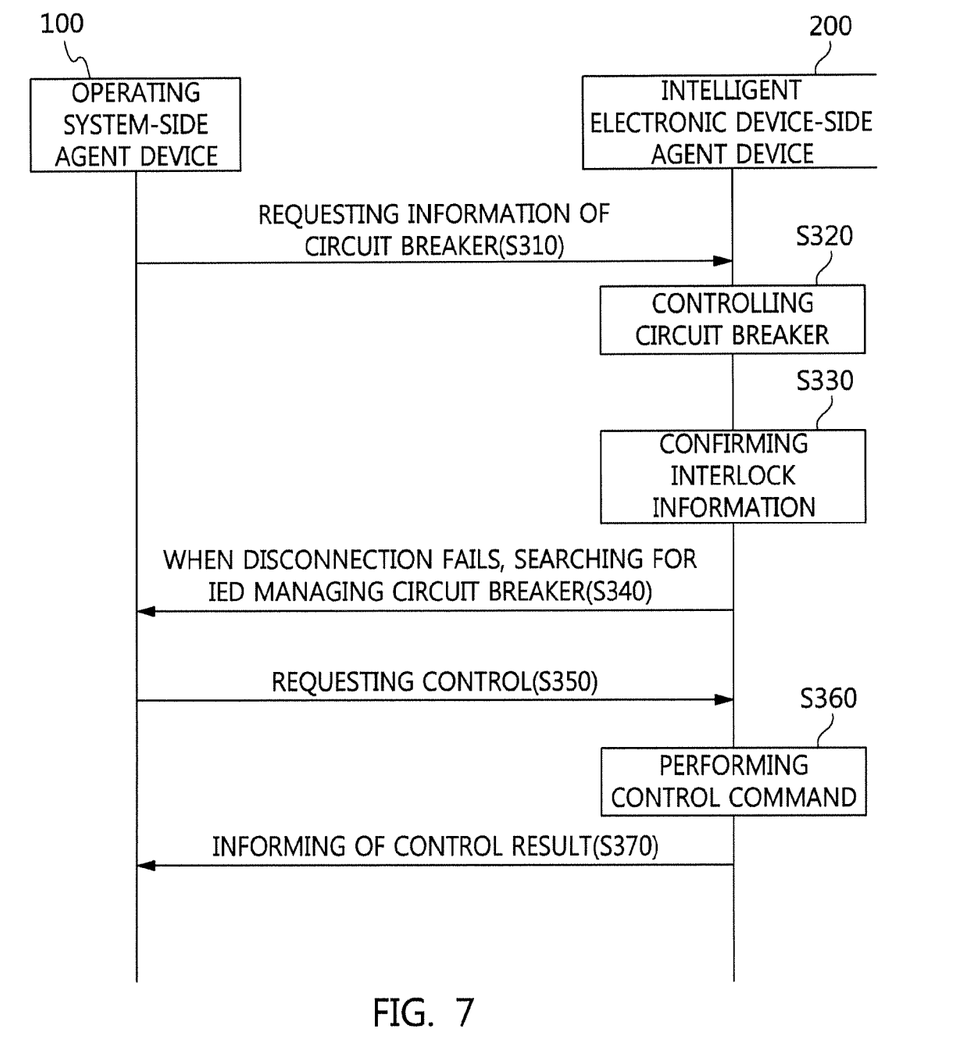

Question: the question is realized by using INS of the IEC 61850 common information model. When an external agent device requests writing to an attribute value (stVal) and a factor list, disclosed below, by using an IEC 61850 write command, an agent device may provide the requested information by using the answer list or may give a command to the IED connected with the agent device. In addition, the question is inputted into the attribute value (stVal) by distinguishing a type of service indicated as integral numbers, and the services are shown in FIGS. 6 and 7.

Factor list: the factor list is realized by using LPL, INS or a new common information model of the IEC 61850 common information model, and includes at least one factor for the question of the agent device or for request command to the IED connected with the agent device.

Answer list: the answer list is realized by using LPL, INS or a new common information model of the IEC 61850 common information model, and may include a plurality of attribute values used to provide the information of the agent device by using the question and the factor list by another agent device. In addition, the answer list is updated by the agent device after receiving the question. After receiving detailed switch information of the digital substation through the answer list, the agent device that requests the information may receive detailed switch information again through service requests such as an IEC 61850 read command of ISWI of the agent device, etc.

Figure 5:
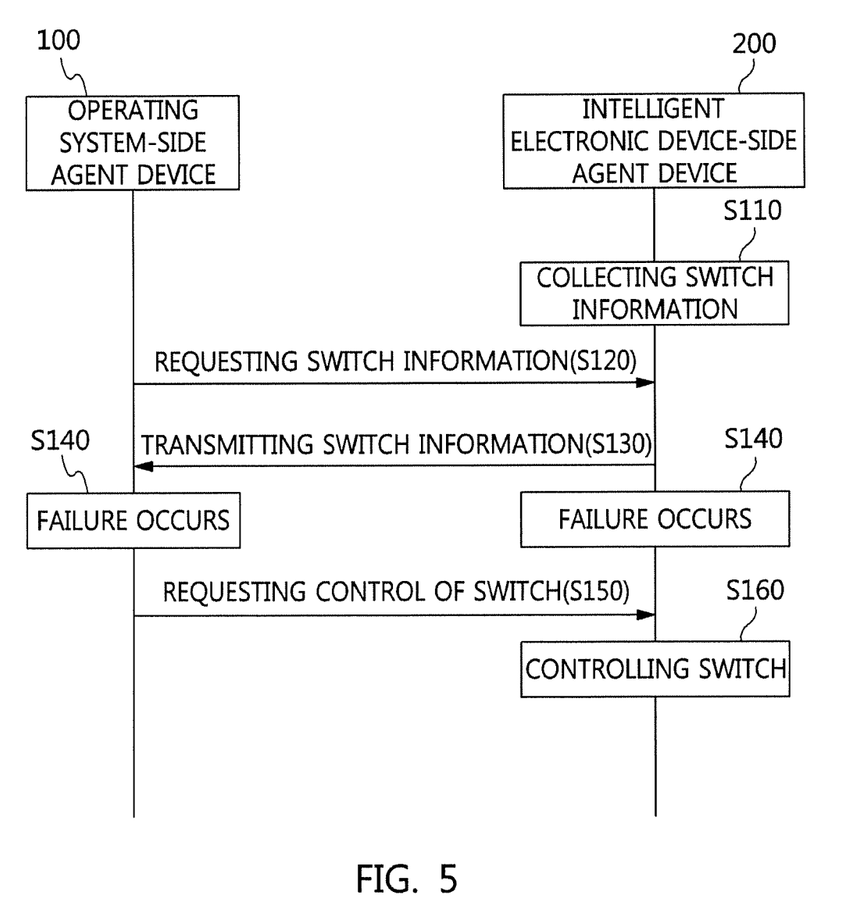
FIG. 5 is a flowchart showing an operation method for the agent system according to an embodiment of the present invention.

FIG. 5 is a flowchart showing an operation method for the agent system according to the embodiment of the present invention. As described above, according to the embodiment of the present invention, the agent system may include the operating system-side agent device 100 and the intelligent electronic device-side agent device 200. In addition, according to the embodiment of the present invention, in the agent system, the operating system-side agent device 100 and the intelligent electronic device-side agent device 200 are respectively provided as modules, and are respectively mounted in the operating system and the intelligent electronic device (IED). In addition, according to the embodiment of the present invention, in the agent system, the operating system-side agent device 100 and the intelligent electronic device-side agent device 200 communicate with each other one to one. Hereinafter, an operation method for the agent system according to an embodiment of the present invention will be described.

First, the intelligent electronic device-side agent device 200 collects switch information of the switch or of the circuit breaker managed by an intelligent electronic device at step S110.

Second, the operating system-side agent device 100 requests the switch information from the intelligent electronic device-side agent device 200 at step S120. Third, the intelligent electronic device-side agent device transmits the switch information collected at step S110 to the operating system-side agent device at step S130.

As described above, the operating system-side agent device 100 and the intelligent electronic device-side agent device 200 communicate with each other one to one to request information. In addition, as shown in FIGS. 1 and 2, in the case of being unaware of which agent device includes information requested by the operating system-side agent device 100 among the plurality of the intelligent electronic device-side agent devices of the digital substation, the search token may be generated in advance of the requesting of the switch information at step S120, and the search token may be transmitted at the requesting of the switch information at step S120. Here, the method of collecting information by using the search token is disclosed in detail above, and additional descriptions thereof will be omitted.

Here, a method of sharing the switch information between the operating system-side agent device 100 and the intelligent electronic device-side agent device 200 is: collecting of the switch information at step S110, requesting of the switch information at step S120, and transmitting of the collected switch information by the intelligent electronic device-side agent device to the operating system-side agent device at step S130. In addition, the operating system-side agent device 100 may request control of the switch besides the request for information. The request for controlling the switch may be performed, for example, according to the failure recovery algorithm of the operating system or worker needs in the case of failure of the digital substation. Hereinafter, an example of requesting control in the case of the failure will be described.

When a failure occurs, the operating system-side agent device 100 requests control of the switch or the circuit breaker managed by the intelligent electronic device from the intelligent electronic device-side agent device 200 at step S150. As described above, the algorithm used in controlling the switch is included in the operating system, and a type of the algorithm is not limited to a one specific type.

Next, the intelligent electronic device-side agent device 200 controls the switch according to the failure recovery algorithm of the operating system at step S160.

Throughout the description, communications between the agent devices means communication between the operating system-side agent device 100 and the intelligent electronic device-side agent device 200, but this is just an example. It should be noted that it is possible to perform communications between the plurality of the intelligent electronic device-side agent devices 200 besides the communication between the operating system-side agent device 100 and the intelligent electronic device-side agent device 200.

FIG. 6 is a flowchart showing services that may be performed by the operating system according to an embodiment of the present invention. Services of information request and response between the agent devices will be described with reference to FIG. 6.

An agent device of the intelligent electronic device (IED) or of the operating system including the failure recovery algorithm may request information by using a question attribute value of the question answer attribute (IQNA) logical node of another agent device. In addition, an agent device that received question or control command may provide results of received command such as the requested information, control, etc. by using the answer list of the question answer attribute (IQNA). The below-described steps are performed between the operating system-side agent device 100 and the intelligent electronic device-side agent device 200, but this is just an example. The below-described steps may be performed between the plurality of the intelligent electronic device-side agent devices 200.

First, the operating system-side agent device 100 requests information of a specific circuit breaker at step S210. In this case, the intelligent electronic device-side agent device 200 that receives the information request may provide information of the circuit breaker or switch information that are collected by the intelligent electronic device-side agent device 200 mounted in the intelligent electronic device by using the switch attribute ISWI and the answer list of the question answer attribute (IQNA) at step S220.

In addition, the operating system-side agent device 100 searches for an intelligent electronic device managing a specific switch by using the search token or by using a direct one to one question at step S230. Each of agent devices that receives the question answers whether or not the requested switch information of the specific switch is equal to switch information of the intelligent electronic device for each of agent devices by using the answer list of the question answer attribute (IQNA) at step S240.

In addition, the operating system-side agent device 100 requests confirmation of control availability of the specific circuit breaker by using the question answer attribute (IQNA) at step S250. The intelligent electronic device-side agent device 200 that receives the confirmation request answers the control availability of the specific circuit breaker by using information received from the intelligent electronic device (IED) at step S260.

In addition, the operating system-side agent device 100 requests specific data information of the circuit breaker or the switch of the digital substation by using the question answer attribute (IQNA) through the search token or through 1:1 IEC 61850 reading service at step S270. The intelligent electronic device-side agent device 200 that receives the request for the specific data information provides the specific data information to the search token, or provides an answer to the operating system-side agent device by using the answer list of the question answer attribute (IQNA) at step S280.

FIG. 7 is a flowchart showing services that may be performed by the operating system according to an embodiment of the present invention. Services of performing control request and control between the agent devices will be described with reference to FIG. 7.

First, the operating system-side agent device 100 requests control of the circuit breaker or a disconnect switch from another agent device, namely, the intelligent electronic device-side agent device 200 of the intelligent electronic device according to the failure recovery algorithm of the digital substation at step S310. Next, the intelligent electronic device-side agent device 200 controls the circuit breaker in response to the control request at step S320. In addition, the intelligent electronic device-side agent device 200 may confirm interlock information for selectively controlling the circuit breaker while controlling the circuit breaker at step S330.

At the above-described steps, when the request for controlling the circuit breaker by the intelligent electronic device-side agent device 200 fails, the operating system-side agent device 100 or an intelligent electronic device-side agent device 200, which controls the circuit breaker or requests for controlling the circuit breaker, may request to search for another agent device at step S340. The another agent device controls the circuit breaker or a controller, which fails in disconnection thereof, by using the search token or the one to one question. Here, when detecting the another agent device, which may control the circuit breaker or the controller that fails in disconnection thereof, the intelligent electronic device-side agent device managing the another agent device is requested to control the circuit breaker at step S350. Next, the intelligent electronic device-side agent device that receives the control request performs the control command at step S360, and transmits the control result to the operating system-side agent device at step S370.

As described above, the IEC 61850 information-based agent system for the intelligent system management by the digital substation is digitalized based on international standard IEC 61850, whereby it is possible to share information of data being used in the agent devices for the intelligent system, failure recovery of the digital substation, etc. without limitations by using an abundance of information that greatly exceeds that of a conventional analogue substation. In addition, it is possible to provide the agent system as a hierarchical system having higher and lower parts or as a horizontal system wherein agent devices may be subjects of system management at the same positions.

As a method of sharing information, the IEC 61850 information-based agent system uses the data model and communication service based on IEC 61850 standard of the digital substation without a separate protocol, whereby it is possible to provide interoperability for sharing the data without separate communication interpretation conversion or interpretation functions. Therefore, the agent device is used at the operating system or the IED without limitations regardless of any failure recovery algorithm.

The IED or the higher operating system, etc. of the digital substation have an abundance of information for operating the digital substation, and may provide the information to a place requiring the information. However, all processes of providing the information were based on predetermined contents, and the information was maintained only in a fixed form. Therefore, there were limitations on collecting information for an application program such as failure recovery of the substation, etc. However, according to the IEC 61850 information-based agent system, the agent devices have configurations of a conventional digital substation. The agent device which is an information sharing device is inserted into the IED or the operating system, whereby the agent device of the IED may collect and arrange the related data of information of the IED on the basis of the content of the request. Therefore, it is possible for the IED to directly perform the control command to the switch, etc. on the basis of need.

In addition, according to the IEC 61850 information-based agent system, it is possible to autonomously collect required information without influence on configurations of the digital substation. It is possible to provide an infrastructure environment between the agent devices so as to perform control of the switch, etc. of the digital substation regardless of any failure recovery algorithm.

The agent system for the intelligent system management by the digital substation and the operation method therefor according to the embodiment of the present invention may be implemented as a program or a smartphone app that can be executed by various computer means. In this case, the program or smartphone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

The instructions of principles of the present invention may be implemented as combinations of hardware and software. Further, software may be implemented as an application program actually running on a program storage unit. The application program may be uploaded to a machine including any suitable architecture and executed by the machine. Preferably, a machine may be implemented on a computer platform having hardware such as one or more CPUs, computer processors, RAM, and Input/output (I/O) interfaces. Further, the computer platform may include an operating system and micro-instruction codes. Various processes and functions described here may be part of micro-instruction codes or part of application programs, or any combinations thereof, and may be executed by various processing devices including CPUs. Furthermore, various other peripherals such as an additional data storage unit and printer may be connected to the computer platform.

Since part of the configuration systems, components and methods illustrated in the attached drawings are implemented using software, it should be additionally understood that actual connections between system components or process function blocks may be varied according to the scheme in which the principles of the present invention are programmed. When such instructions are given, those skilled in the art will be able to consider the principles of the present invention and similar embodiments or configurations.

The invention claimed is:

1. An operating system-side agent device for sharing switch information, which is used in automatic recovery of a digital substation, between an operating system and an intelligent electronic device (IED) in the digital substation, the device comprising a processor and a non-transitory memory coupled to the processor and storing instructions executable by the processor, the processor configured to:
   request the switch information from an intelligent electronic device-side agent device mounted in the intelligent electronic device (IED); and
   receive the switch information from the intelligent electronic device-side agent device, the switch information being collected by the intelligent electronic device-side agent device,
   wherein the operating system-side agent device is provided as a module, and is mounted in the operating system,
   wherein the switch information comprises a switch attribute of a switch, a question answer attribute used in request and response between the intelligent electronic device-side agent device and the operating system-side agent device, and an IEC 61850 standard based common data class (CDC) model attribute, and
   where the switch attribute comprises at least one of a circuit breaker name, state information of the switch managed by the intelligent electronic device (IED), a control type for the switch operated by the intelligent electronic device (IED), control availability information of the switch, and interlock configuration information and interlock signal information that are used for controlling the switch.

2. The device of claim 1, wherein the operating system-side agent device and the intelligent electronic device-side agent device communicate with each other one to one.

3. The device of claim 1, wherein the processor is further configured to:
   generate a search token searching for a specific intelligent electronic device including the switch information requested by the processor.

4. The device of claim 3, wherein the search token is transmitted to one intelligent electronic device-side agent device of all intelligent electronic device-side agent devices of the digital substation, and stores data of a comparison result of the requested switch information and switch information managed by the one intelligent electronic device-side agent device.

5. The device of claim 4, wherein the search token sequentially stores the data of the comparison result with the all intelligent electronic device-side agent devices, and transmits the data of the comparison result stored in the search token to the operating system-side agent device.

6. The device of claim 1, wherein the question answer attribute comprises at least one of a question, a factor list, and an answer list.

7. The device of claim 1, wherein the processor requests control of a switch of the digital substation from the intelligent electronic device-side agent device according to a failure recovery algorithm of the operating system.

8. An intelligent electronic device-side agent device for sharing switch information, which is used in automatic recovery of a digital substation, between an operating system and an intelligent electronic device (IED) in the digital substation, the device comprising a processor and a non-transitory memory coupled to the processor and storing instructions executable by the processor, the processor configured to:
   collect the switch information of a switch managed by the intelligent electronic device (IED), and transmit the switch information to an operating system-side agent device through a communication device, when the operating system-side agent device mounted in the operating system requests the switch information,
   wherein the intelligent electronic device-side agent device is provided as a module, and is mounted in the intelligent electronic device,
   wherein the switch information comprises a switch attribute of the switch, a question answer attribute used in request and response between the intelligent electronic device-side agent device and the operating system-side agent device, and an IEC 61850 standard based common data class (CDC) model attribute, and
   wherein the switch attribute comprises at least one of a circuit breaker name, state information of the switch managed by the intelligent electronic device (IED), a control type for the switch operated by the intelligent electronic device (IED), control availability information of the switch, and interlock configuration information and interlock signal information that are used for controlling the switch.

9. The device of claim 8, wherein the operating system-side agent device and the intelligent electronic device-side agent device communicate with each other one to one.

10. The device of claim 8, wherein when a search token is received from the operating system-side agent device, the processor determines whether or not the switch information is information requested by the operating system-side agent device by comparing the switch information with the search token, and stores data of a comparison result in the search token.

11. The device of claim 10, wherein the processor transmits the search token to another intelligent electronic device-side agent device after storing the data of the comparison result.

12. The device of claim 8, wherein the question answer attribute comprises at least one of a question, a factor list and an answer list.

13. The device of claim 8, wherein the processor is further configured to:
   control the switch according to a preset failure recovery algorithm of the operating system, when request for controlling the switch is received from the operating system-side agent device.

14. An operation method for an agent system including both an operating system-side agent device and an intelligent electronic device-side agent device, each of which comprises a processor and a non-transitory memory coupled to the processor and storing instructions executable by the processor, for sharing switch information, which is used in automatic recovery of a digital substation, between an operating system and an intelligent electronic device (IED) in the digital substation, the operation method comprising:
   collecting, by the processor of the intelligent electronic device-side agent device, the switch information of a switch managed by the intelligent electronic device (IED);
   requesting, by the processor of the operating system-side agent device, the switch information from the intelligent electronic device-side agent device; and
   receiving, by the processor of the operating system-side agent device, the switch information,
   wherein the operating system-side agent device and the intelligent electronic device-side agent device are respectively provided as modules, and are respectively mounted in the operating system and the intelligent electronic device, wherein the switch information comprises a switch attribute of the switch, a question answer attribute used in request and response between the intelligent electronic device-side agent device and the operating system-side agent device, and an IEC 61850 standard based common data class (CDC) model attribute, and wherein the switch attribute comprises at least one of a circuit breaker name, state information of the switch managed by the intelligent electronic device (IED), a control type for the switch operated by the intelligent electronic device (IED), control availability information of the switch, and interlock configuration information and interlock signal information that are used for controlling the switch.

15. The operation method of claim 14, wherein at the collecting of the switch information, the operating system-side agent device and the intelligent electronic device-side agent device communicate with each other one to one.

16. The operation method of claim 15, wherein the collecting of the switch information comprises:
searching for a specific intelligent electronic device including the switch information requested by the operating system-side agent device by using a search token generated by the operating system-side agent device.

17. The operation method of claim 14, further comprising:
requesting, by the operating system-side agent device, control of the switch of the digital substation from the intelligent electronic device-side agent device according to a failure recovery algorithm of the operating system; and
controlling, by the intelligent electronic device-side agent device, the switch according to the failure recovery algorithm.

* * * * *